Oct. 25, 1932. G. F. NYE 1,884,152
CENTRIFUGAL THRESHING AND SEPARATING DEVICE
Filed Jan. 22, 1931
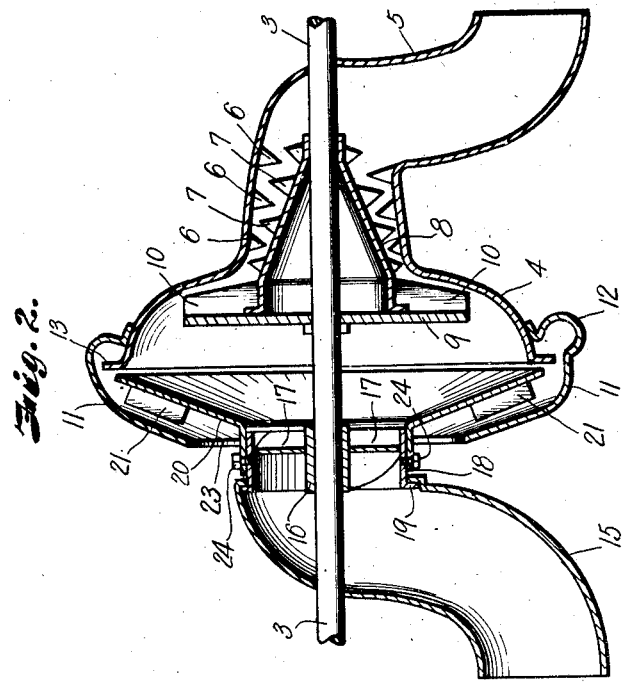
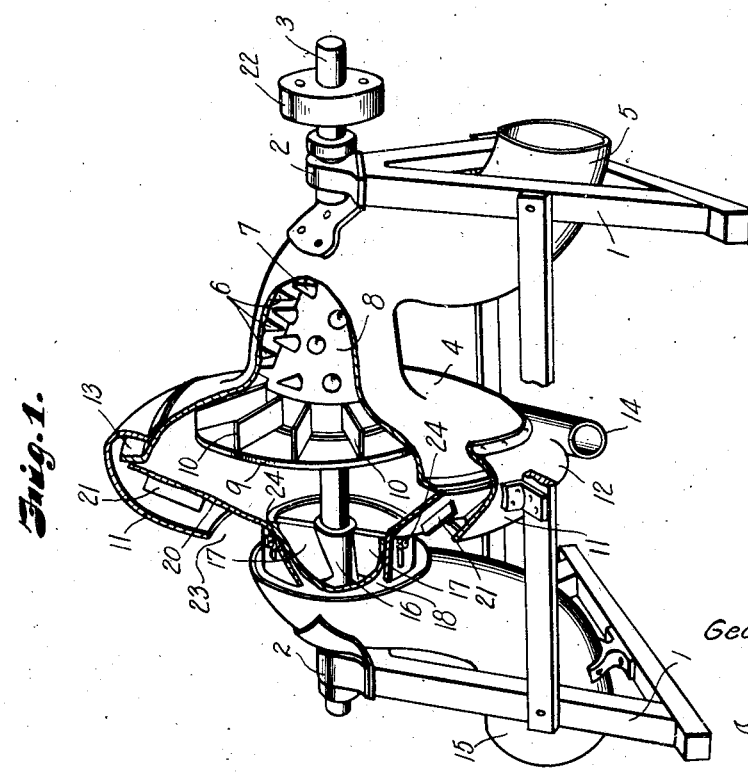
INVENTOR
George Francis Nye
BY
Thos. E. Scofield
ATTORNEY Patented Oct. 25, 1932

1,884,152

UNITED STATES PATENT OFFICE

GEORGE FRANCIS NYE, OF KEARNEY, NEBRASKA

CENTRIFUGAL THRESHING AND SEPARATING DEVICE

Application filed January 22, 1931. Serial No. 510,469.

This invention relates to improvements in a centrifugal threshing and separating device, and refers more particularly to an improved type of threshing and separating mechanism utilizing an air blast fan for drawing the crop into the threshing mechanism, and a counter blast fan for facilitating the separation of the grain kernels from the chaff and straw.

Particular novelty resides in the mounting upon a single shaft of two air blast fans, both receiving their power from a single source. The function of one fan is to supply an air blast by means of which the crop is drawn into the threshing mechanism and the chaff and straw discharged through a discharge pipe, the second or counter blast fan aiding in the separation of the chaff and straw from the grain kernels. A further purpose of the fan which draws the crop into the threshing mechanism is to impart centrifugal force to the grain kernels which, together with the counter blast of the second fan effects the separation of the chaff and straw from the heavier grain.

Fig. 1 is a perspective view of a unit, showing the invention with parts broken away to facilitate understanding of the device.

Fig. 2 is a sectional view of the mechanism shown in Fig. 1.

Referring to the drawing, the unit is preferably mounted upon two tripod standards designated as 1. Thus a frame supports the bearings 2 which carry the shaft 3. The housing enclosing the fan consists of a portion 4 which is tapered to form an inlet opening or pipe 5. On the interior of the housing are affixed a plurality of threshing pins 6 which are staggered with similar pins 7, mounted upon a threshing cone 8. This threshing cone is, in turn, mounted upon the shaft 3 and serves as a support for the fan disk 9 and fan blades 10. A second enclosure 11, in which is formed a grain collecting channel or tube 12 is positioned outside of the bell shaped end of the housing 4. The end of the housing 4 terminates in the flange 13. The channel or volute 12 terminates in a grain tube discharge pipe 14. At the opposite end of the threshing unit is a discharge pipe 15. Intermediate the fan disk 9 and the discharge pipe is a second rotating hub 16, mounted upon the shaft 3. Integral with the hub are spiral discharge blades 17 which facilitate the discharge of the chaff and straw through the pipe 15.

Surrounding the spiral blades 17 is a flange drum 18, the flange 19 engaging a similar flange on the discharge pipe 15 and assuring an air-tight connection. Adjustably attached to the drum 18 is a cone 20 which carries the counter blast fan blades 21. The circumference of the cone lies adjacent to the flange 13 of the housing 4 and may be adjusted so that the annular space between the cone and the housing may be fixed at any desired width according to the type of grain which is being threshed, the adjustment also depending on the relative velocity and force of the two opposed air blasts from the fan blades 10 and counter blast fan blades 21.

It is contemplated that the shaft 3 may be driven direct from any suitable source of power, such as an internal combustion engine, or it may be driven by portable power through the pulley 22 mounted upon the shaft 3. It also may be mounted in connection with a combine harvester or as a separate harvester unit.

In operation, a crop is supplied by any suitable means into the inlet pipe 5. The gathering of the crop may be done manually or by automatic means such as sickle cutter and conveyor such as is mounted upon combine harvesters well known in the art. The crop advances due to the suction created by the air blast fan 10 and is threshed by the pins 6 and 7. The grain kernels, chaff and straw are then picked up by means of the fan and discharged at high velocity against the curved inner surface of the housing. The heavier grain kernels cling tenaciously to the housing and, due to its shape, advances to the slot formed by the flange 13 and the cone 20. Due to the fact that the grain kernels are heavier than the chaff and straw, the grain will pass through the slot and follow the curvature of the outer housing into the channel 11, thence through the grain discharge pipe 14. The separation of the grain kernels from the chaff and straw is facilitated at the point where the grain kernels pass through the slot due to the fact that the whirling cone 20 receives the grain from the housing and imparts additional centrifugal force thereto. At the same time, the counter air blast, set up by the fan blades 21, blows air in an opposed direction to the blast set up by the fan blades 10 and, at the slot or annular opening, effects a clean separation of the grain kernels from the lighter chaff and straw.

The counter air blast enters the housing through an opening in the enclosure 11 designated as 23. A portion of this counter air blast is discharged through the annular slot combining with the air blast from the fan 10, while the remainder passes out through the channel 11 and grain discharged pipe 14.

In Fig. 1, the disclosure shows the hub of the cone 20 slotted to accommodate bolts 24. This adjustment may be effected in any suitable way in order that the distance between the cone and the flange 13 of the housing can be carefully maintained to satisfy conditions with different types of grains and different characteristics of the same grain.

The device shown in the drawing is positioned horizontally but it may be effectively operated in any position, either vertical or horizontal, or at an angle.

The threshing unit shown is of a simple nature but the invention contemplates the use of a rasp cylinder in place of the threshing pins, or any suitable type of threshing mechanism in place of the threshing mechanism shown.

Furthermore, the air blast fan 10 may be a separate unitary structure or combined with the threshing unit in many ways, and likewise, the counter blast fan may be mounted in innumerable variations without departing from the scope of the invention.

I claim as my invention:

1. A threshing machine comprising in combination a casing, a shaft rotatably mounted in said casing, coacting threshing elements mounted on said shaft and said casing respectively, an inlet duct at one end of said casing for leading the material to be threshed to said threshing elements, a disk mounted on said shaft inwardly of said threshing elements, said disk adapted to throw the threshed material by centrifugal force in a plane substantially perpendicular to the axis of said shaft, a chaff discharge outlet at the other end of said casing, a fan mounted on said shaft, a baffle plate forming part of said fan, said fan adapted to create an air blast to overcome the momentum imparted to the light chaff and discharge it through said chaff outlet, a grain collecting channel formed in said casing adapted to receive the grain thrown through the air blast by centrifugal force, and a grain discharge outlet for said channel.

2. A threshing machine according to claim 1, wherein said disk is provided with suction fan blades.

3. A threshing machine according to claim 1 wherein said baffle plate is in the form of a truncated cone.

4. A threshing machine according to claim 1 wherein said fan baffle plate is supported by suction fan blades for setting up an auxiliary air blast in said grain discharge channel.

5. A threshing machine according to claim 1 wherein said baffle plate is provided with means for adjusting the same longitudinally of the axis of said shaft.

6. A threshing machine according to claim 1 in which said channel extends in a plane substantially perpendicular to the axis of said shaft and intermediate said inlet and said chaff outlet.

In testimony whereof I affix my signature.

GEORGE FRANCIS NYE.